S. C. DORLAND.
FLY TRAP.
APPLICATION FILED OCT. 4, 1912.
1,069,587. Patented Aug. 5, 1913.
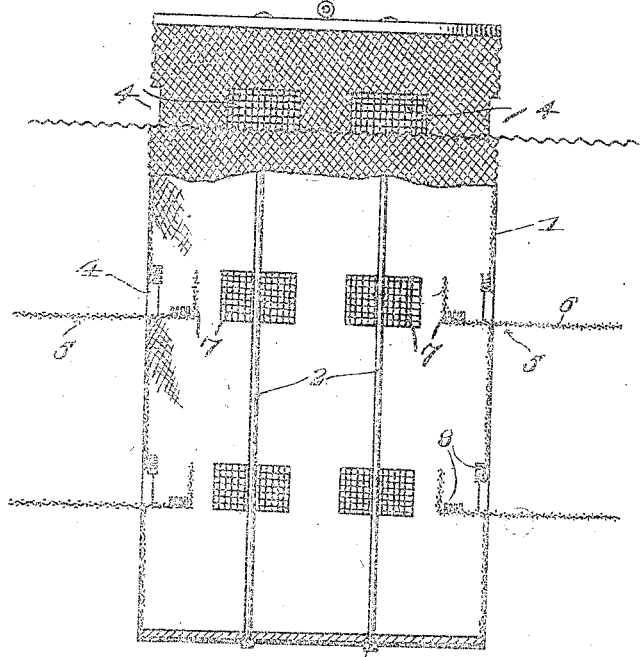
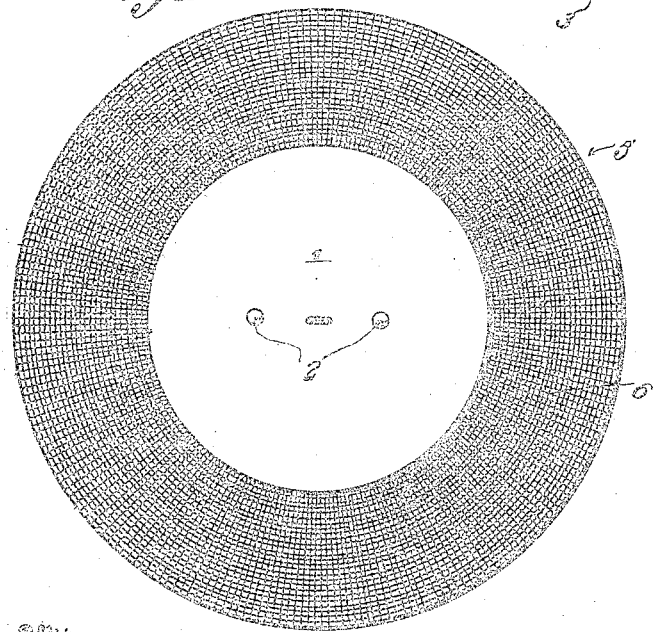
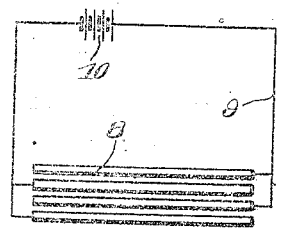
Inventor
S. C. Dorland,
By Victor J. Evans
Attorney
Witnesses
J. H. Crawford
John J. McCarthy

UNITED STATES PATENT OFFICE.

SIMEON C. DORLAND, OF NORMAN, OKLAHOMA.

FLY-TRAP.

1,069,537. Specification of Letters Patent. Patented Aug. 5, 1913.

Application filed October 4, 1912. Serial No. 723,903.

*To all whom it may concern:*

Be it known that I, SIMEON C. DORLAND, a subject of the King of Great Britain, residing at Norman, in the county of Cleveland and State of Oklahoma, have invented new and useful Improvements in Fly-Traps, of which the following is a specification.

This invention relates to improvements in fly traps and has particular application to electric fly traps.

In carrying out the present invention, it is my purpose to provide a trap of the class set forth whereby flies and similar insects may be caught or trapped and confined within the body of the trap thereby preventing the escape of the insects so that the latter may be exterminated in any suitable manner. It is also my purpose to provide a fly trap which will embrace the desired features of simplicity, efficiency and durability and which may be manufactured and marketed at a relatively low cost.

With the above and other objects in view, the invention consists in the construction, combination and arrangement of parts hereinafter set forth in and falling within the scope of the claims.

In the accompanying drawings; Figure 1 is a top plan view of a trap constructed in accordance with the present invention. Fig. 2 is a vertical sectional view thereof, and Fig. 3 is a diagrammatic view of contact strips and an electric circuit including the same.

Referring now to the accompanying drawing in detail, the numeral 1 indicates the body of the trap which is preferably constructed of foraminous material such as wire netting, suitable retaining bolts 2 being passed through the body and securely fastened to the top and bottom walls thereof by means of nuts or the like 3. Extending circumferentially of the body 1 and disposed one above another are sets of inlet openings 4, while suitably secured to the lower walls of each set of inlet openings is a platform 5 comprising a horizontal portion 6 extending outwardly of the body 1 and circumferentially thereof, and vertical portions 7 disposed within the body at the rear of the respective openings 4.

In order to force the insects into the body of the trap and prevent such insects from leaving the trap, I employ groups of contact plates 8, one group being disposed upon the horizontal portion 6 of each platform 5 immediately adjacent to the vertical portion 7 thereof, while another group is fastened to the inner wall of the body 1 of the trap immediately above each set of inlet openings, as clearly illustrated in Fig. 2. The contact plates of each group are connected in multiple or parallel with an electric circuit 9 as clearly illustrated in Fig. 3, such circuit including a suitable source of electrical energy as a battery 10, for instance.

From the foregoing description taken in connection with the accompanying drawing, the construction, and manner of employing my invention will be readily apparent. To coax the flies or other insects into the trap, the various platforms are coated with sugar or some similar substance so that the insects will approach the group of contact strips on the respective platform. When the insects reach the contact strips on the platform, such insects receive an electric shock and are forced to fly into the body of the trap. Should the insect endeavor to leave the trap by crawling or walking down the side wall thereof toward one of the openings 4, such insect will bridge a pair of the contact plates of the group above such opening and be compelled to leave the side wall of the trap.

The body 1 of the trap may be suspended from the ceiling of a room or other suitable object, or may be placed upon a table or the like as desired.

I claim:

1. An electric fly trap comprising a body having a number of inlet openings, platforms disposed within each opening, contact strips secured to and insulated from the inner wall of the body and the said platforms and spaced apart, and a normally open electric circuit including a source of energy, and having the opposite sides thereof connected to alternate contacts.

2. An electric fly trap comprising a body having a number of inlet openings, a platform disposed within each opening and including a horizontal portion and a vertical portion, contact strips secured to and insulated from the inner wall of the body above the horizontal portion of each platform and spaced apart, and an electric circuit including a source of energy, and having the opposite sides thereof connected to alternate contacts.

3. An electric fly trap comprising a body formed with a number of circumferential inlet openings arranged one above another, a platform secured to the lower wall of each opening and including a horizontal portion extending outwardly of the body of the trap and a vertical portion disposed in the body of the trap behind the respective inlet opening, groups of contact strips secured to and insulated from the inner wall of the body immediately above each inlet opening therein and to the horizontal portion of each platform and spaced apart, and an electric circuit including a source of energy, and having the opposite sides thereof connected to alternate contacts.

SIMEON C. DORLAND.

Witnesses:
 A. R. CLEMENT,
 J. W. STOKES.